(12) United States Patent  (10) Patent No.: US 8,532,122 B2
Lan et al.  (45) Date of Patent: Sep. 10, 2013

(54) METHOD FOR DYNAMICAL ADJUSTING CHANNEL DIRECTION AND NETWORK-ON-CHIP ARCHITECTURE THEREOF

(75) Inventors: Ying-Cherng Lan, Taipei (TW); Shih-Hsin Lo, Taipei (TW); Sao-Jie Chen, Taipei (TW)

(73) Assignee: National Taiwan University, Taipei (TW)

( * ) Notice: Subject to any disclaimer, the term of this patent is extended or adjusted under 35 U.S.C. 154(b) by 799 days.

(21) Appl. No.: 12/684,890

(22) Filed: Jan. 8, 2010

(65) Prior Publication Data

US 2011/0064087 A1  Mar. 17, 2011

(30) Foreign Application Priority Data

Sep. 14, 2009 (TW) ................................ 98130974 A (51) Int. Cl.
 *H04L 12/28* (2006.01)
(52) U.S. Cl.
 USPC .......................... 370/401; 370/338; 375/376
(58) Field of Classification Search
 USPC .................. 370/401, 338; 375/376
 See application file for complete search history.

(56) References Cited

U.S. PATENT DOCUMENTS

| | | | |
|---|---|---|---|
| 6,240,083 B1* | 5/2001 | Wright et al. | 370/348 |
| 7,116,682 B1* | 10/2006 | Waclawsky et al. | 370/468 |
| 2006/0109829 A1* | 5/2006 | O'Neill | 370/338 |
| 2010/0067634 A1* | 3/2010 | Furman et al. | 375/376 |

OTHER PUBLICATIONS

Ying-Cherng Lan, Shih-Hsin Lo, Yueh-Chi Lin, Yu-Hen Hu and Sao-Jie Chen, "BiNoC: A Bidirectional NoC Architecture withDynamic Self-Reconfigurable Channel", The 3rd ACM/IEEE International Symposium on Networks-on-Chip May 10-13, 2009, San Diego, CA.

* cited by examiner

*Primary Examiner* — Wei Zhao
(74) *Attorney, Agent, or Firm* — Chun-Ming Shih (57) ABSTRACT

A method for dynamical adjusting channel direction and Network-on-Chip architecture thereof are provided. The Network-on-Chip architecture of dynamical adjusting channel direction comprises a first channel, a first router and a second router. The first channel has a first transmission direction. The first router generates and outputs a first output request when receiving a first data. The second router is coupled to the first router through the first channel. The second router receives the first data through the first channel when receiving the first output request.

20 Claims, 11 Drawing Sheets

METHOD FOR DYNAMICAL ADJUSTING CHANNEL DIRECTION AND NETWORK-ON-CHIP ARCHITECTURE THEREOF

CROSS-REFERENCE TO RELATED APPLICATIONS

This application is based upon and claims the benefit of priority from the prior Taiwanese Patent Application No. 098130974, filed Sep. 14, 2009, the entire contents of which are incorporated herein by reference.

BACKGROUND

The present invention relates to a transmission of the network-on-chip architecture. More particularly, the present invention relates to a method for dynamical adjusting channel direction and the network-on-chip architecture thereof.

Figure 7:
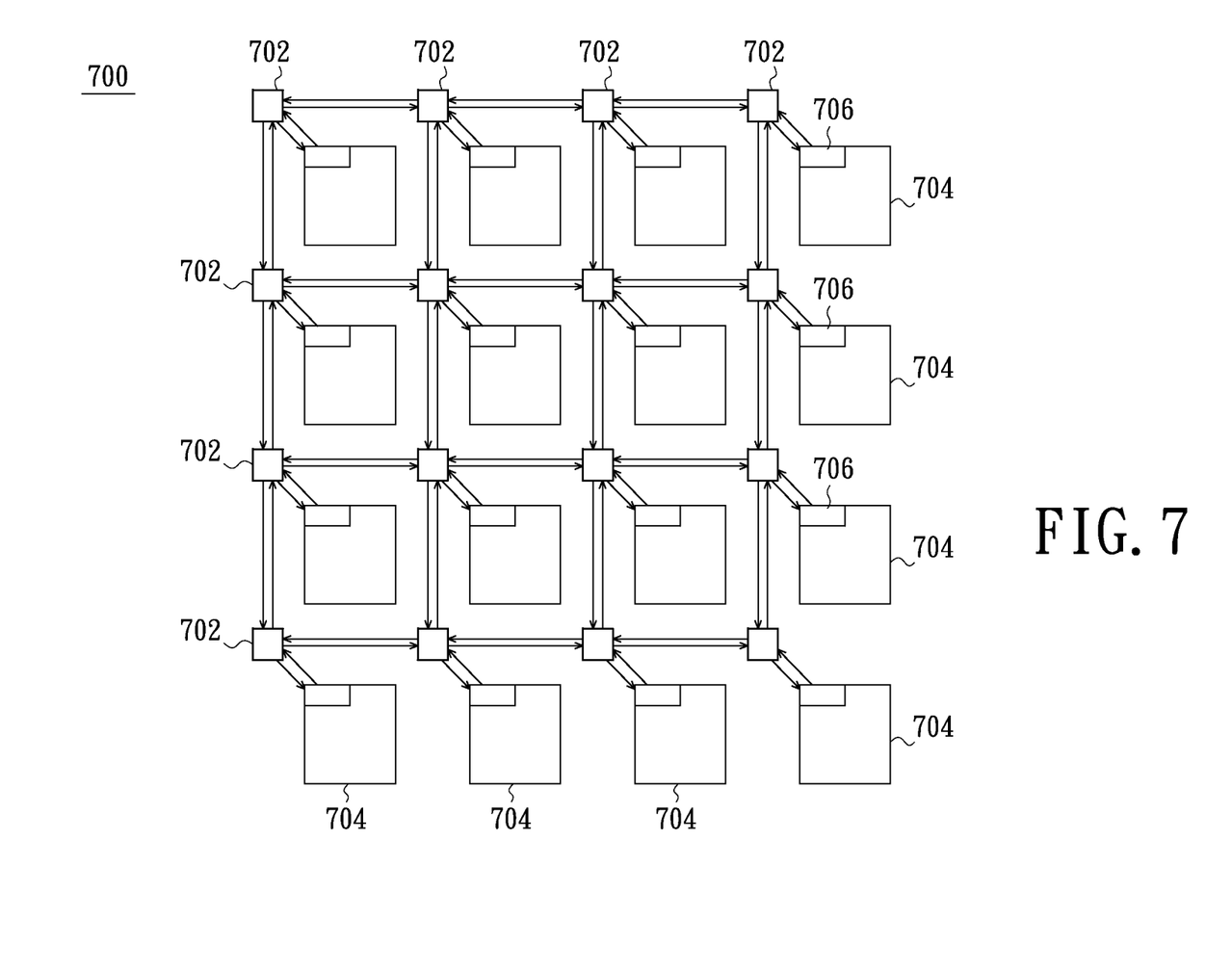
FIG. 7 is a schematic diagram of conventional network-on-chip architecture of mesh topology.

Please refer to FIG. 7, it is a schematic diagram of conventional network-on-chip architecture of the mesh topology. In FIG. 7, the network-on-chip architecture 700 is exampled as 4×4 architecture. The network-on-chip architecture 700 comprises sixteen routers 702 and sixteen processing elements 704. Wherein, every processing element 704 is connected to the corresponding router 702 through the network interface 706. Every router 702 has four direction channels for connecting to the peripheral routers 702.

Figure 8:
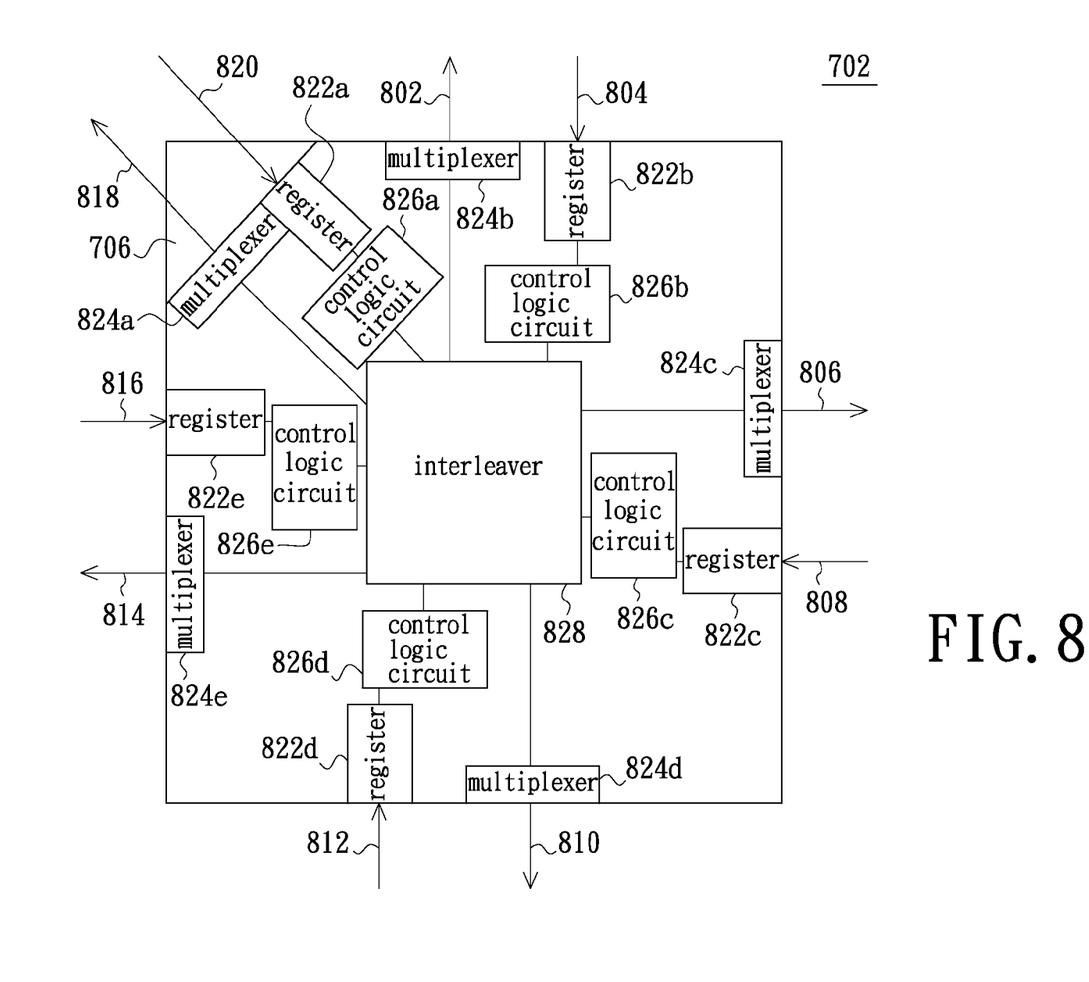
FIG. 8 is a schematic diagram of circuit block of conventional single router.

Please refer to FIG. 8, it is a schematic diagram of circuit block of conventional single router. The router 702 comprises an interleaver 828, five registers 822a~e, five multiplexers 824 a~e, five control logic circuits 826 a~e, four direction channels (labeled as 802~816), and a plurality of channels connected to the processing element 704 of FIG. 7 (labeled as 818 and 820).

In the prior art, the multiplexers 824 a~e and the interleavers 828 are controlled by the control logic circuits 826 a~e. The registers 822a~e are respectively connected between the corresponding control logic circuits 826a~e and the input channels 804,808,812,816,820. The network interface 706 of the router 702 is connected to the network interface 706 of the processing element 704 for communicating through the input channel 820 and the output channel 818 connected to the processing element 704. Wherein, the network interface 706 is connected to the multiplexer 824a and the register 822a.

The output channel 802 of the west direction channel is connected to the multiplexer 824b, and the input channel 804 is connected to the register 822b. The output channel 806 of the east direction channel is connected to the multiplexer 824c, and the input channel 808 is connected to the register 822c. The output channel 810 of the south direction channel is connected to the multiplexer 824d, and the input channel 812 is connected to the register 822d. The output channel 814 of the west direction channel is connected to the multiplexer 824e, and the input channel 816 is connected to the register 822e.

In FIG. 8, when the router 702 outputs the data to another router 702 through the output channel 802 of the west direction channel, only the output channel 802 is used for transmission due to the transmission directions of the output channel 802 and the input channel 804 are fixed. The input channel 804 is at standby state if no data is transmitted from another router 702. Under this channel disposition, if the amount of the transmission data is very large, the input channel 804 is still at the standby state, and only the output channel 802 is used to transmit. Thus, the transmission time of the data is very long, and the output channel 802 is occupied. If another data reaches the router continuously, another data is transmitted after the present data have been transmitted. Therefore, the conventional network-on-chip architecture will cause large waste of time and source.

BRIEF SUMMARY

The present invention relates to a network-on-chip architecture for dynamical adjusting channel direction, it can change transmission direction of channel dynamically for using channel width effectively.

The present invention relates to a method for dynamical adjusting channel direction, it can reduce the delay time of package transmission in the network-on-chip architecture for obtaining higher package transmission rate.

In one aspect of the present invention, a network-on-chip architecture for dynamical adjusting channel direction is provided. The architecture comprises a first channel, a first router, and a second router. The first channel has a first transmission direction. The first router is connected to the first channel for generating and outputting a first output request after receiving a first data. The second router is connected to the first router through the first channel for receiving the first data through the first channel when receiving the first output request. Wherein, the first transmission direction of the first channel defined by the first router and the second router is from the first router to the second router.

In an embodiment of the present invention, the first router comprises a first register, a first routing module, a first input/output port, a first channel control module, and a first arbitration module. The first register receives and stores the first data. The first routing module is connected to the first register for performing a path computation with the first data to obtain and output a first channel request. The first input/output port having a first operation mode is connected to the first channel. The first channel control module is connected to the first routing module and the first input/output port for receiving the first channel request and outputting a first output request after being decoded. The first channel control module generates and outputs a first output arbitration signal and a first output selection signal according to the first channel request. The first arbitration module is connected to the first channel control module for receiving the first output arbitration signal to determine a timing of the first data. Wherein, the first output arbitration signal is determined by the first input/output port for whether to change the first operation mode.

In an embodiment of the present invention, the second router comprises a third input/output port, a second channel control module, and a second arbitration module. The third input/output port having a third operation mode is connected to the first channel. The second channel control module is connected to the third input/output port for receiving the first output request. The second channel control module generates and outputs a second input selection signal according to the first output request. The second arbitration module is connected to the second channel control module. Wherein, the second input selection signal is decided by the third input/output port for whether to change the third operation mode.

In an embodiment of the present invention, the first operation mode and the third operation mode respectively comprises a transmissible state, an idle state, and a wait state.

In an embodiment of the present invention, the second router further comprises a second register and a second routing module. The second register receives and stores the second data. The second routing module is connected to the second register and the second channel control module for performing the path computation with the second data to obtain and output the second channel request.

In an embodiment of the present invention, the second channel request is decoded into a second output request for output when the second channel control module receives the second channel request, and the second channel control module generates and outputs a second output arbitration signal and a second output selection signal according to the second channel request.

In an embodiment of the present invention, the second arbitration module receives the second output arbitration signal and decides a timing of the second data when being outputted according to the second output arbitration signal.

In an embodiment of the present invention, the second channel control module and the first channel control module respectively receives the second output request. The first operation mode is changed into the idle state by the first input selection signal and the third operation mode is changed into wait state by the second output selection signal, and the wait state is changed into the transmissible state when reaching a threshold time.

In an embodiment of the present invention, when the second channel control module and the first channel control module respectively receives the second output request, the first operation mode is changed into the idle state by the first input selection signal and the third operation mode is changed into wait state by the second output selection signal, and the wait state is changed into the transmissible state when reaching a threshold time.

In another aspect of the present invention, a method for dynamical adjusting channel direction is provided. The method for dynamical adjusting channel direction comprises step of receiving and temporarily storing a first data; step of performing a path computation to obtain a first channel request; step of receiving the first channel request and decoding the first channel request for obtaining a first output request to generate a first output arbitration signal and a first output selection signal according to the first channel request; step of generating a second input selection signal according to the first output request; step of determining whether changing the first operation mode and the second operation mode according to the first output selection signal.

In another aspect of the present invention, The method for dynamical adjusting channel direction further comprises step of receiving and storing a second data; step of performing the path computation with the second data to obtain a second channel request; step of decoding the second channel request into a second output request to generate a second output arbitration signal and a second output selection signal according to the second channel request; step of generating a first input selection signal according to the second output request.

In the present invention, the method for dynamical adjusting channel direction can change the transmission direction of the channels elastically and use frequency width effectively. Besides, the method can reduce the delay time during the package transmission and has higher package transmission efficiency.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1A:
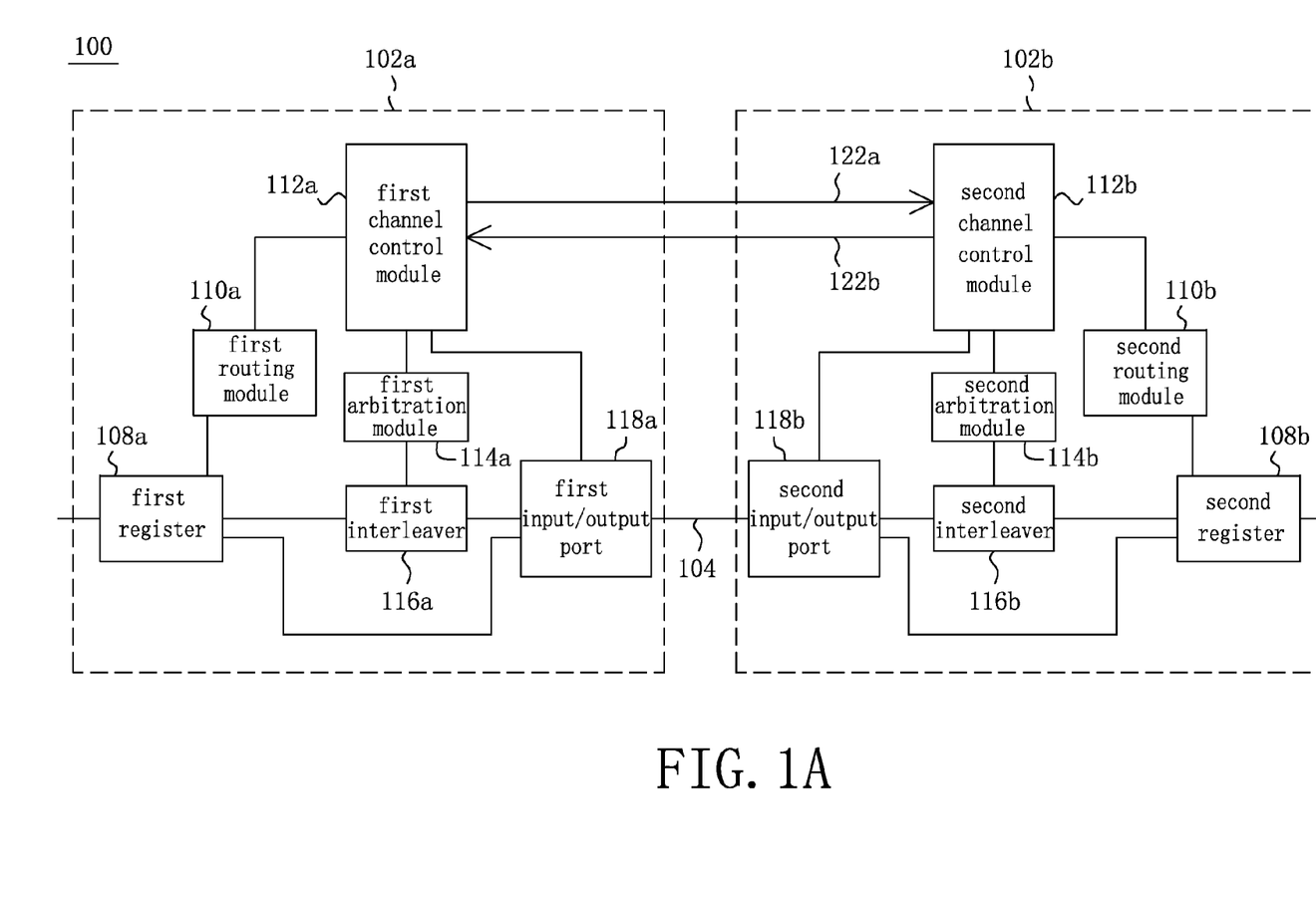
FIG. 1A is a schematic diagram of circuit block of adjacent routers in a network-on-chip architecture of an embodiment of the present invention.

Please refer to FIG. 1A, it is a schematic diagram of circuit block of adjacent routers in a network-on-chip architecture of an embodiment of the present invention. The network-on-chip architecture 100 comprises a first router 102a, a second router 102b, and a first channel 104. Wherein, the first channel 104 is connected to the first router 102a and the second router 102b. In an initial state, a first transmission direction of the first channel 104 defined by the first router 102a and the second router 102b is from the first router 102a to the second router 102b. Besides, signal transmission lines 122a, 122b are connected between the first router 102a and the second router 102b.

The first router 102a comprises a first register 108a, a first routing module 110a, a first channel control module 112a, a first arbitration module 114a, a first interleaver 116a, and a first input/output port 118a. Wherein, a first data transmitted from other router is temporarily stored in the first register 108a and outputted to the first routing module 110a and the first interleaver 116a respectively. The first routing module 110a receives the first data and performs a path computation according to a head of the first data to obtain a first channel request. Then, the first routing module 110a outputs the first channel request to the first channel control module 112a. Wherein, one of ordinary skill in the art should know that the head can comprises an address of the destination router. The present invention, however, is not limited thereto. Besides, the first register 108a can only transmit the head of the first data to the first routing module 110a.

The first channel control module 112a decodes the first channel request for generating a first output request to output the first output request to the second router 102b through the signal transmission line 122a when the first channel control module 112a receives the first channel request. Secondly, the first channel control module 112a also generates a first output arbitration signal and a first output selection signal according to the first channel request for outputting the first output arbitration signal to the first arbitration module 114a and outputting the first output selection signal to the first input/output port 118a.

The first arbitration module 114a is connected to the first channel control module 112a and the first interleaver 116a.

The first arbitration module 114a receives the first output arbitration signal and decides a timing of the first data according to the first output arbitration signal.

The first input/output port 118a having a first operation mode is connected to the first channel 104 and the first channel control module 112a. Wherein, the first input/output port 118a receives the first output selection signal and decides whether to change the first operation mode.

The first interleaver 116a is connected to the first register 108a and the first input/output port 118a. The first interleaver 116a outputs the first data temporarily stored in the first register 108a to the second router 102b through the first input/output port 118a and the first channel 104. Wherein, the first interleaver 116a outputs the first data according to the timing decided by the first output arbitration signal.

The second router 102b comprises a second register 108b, a second routing module 110b, a second channel control module 112b, a second arbitration module 114b, a second interleaver 116b, and a second input/output port 118b. Wherein, the second input/output port 118b having a second operation mode is connected to the first channel 104.

In a preferred embodiment of the present invention, the first operation mode and the second operation mode respectively comprises a transmissible state (i.e. free state), an idle state, and a wait state.

The second channel control module 112b is connected to the second input/output port 118b. The second channel control module 112b receives the first output request through the signal transmission line 122a and generates a first input selection signal according to the first output request for outputting the first input selection signal to the second input/output port 118b.

The second arbitration module 114b is connected to the second channel control module 112b and the second interleaver 116b. Wherein, the second input/output port 118b receives the first input selection signal and decides whether to change the second operation mode.

The second register 108b receives and temporarily stores a second data transmitted from other routers (not shown). The second routing module 110b is connected to the second register 108b and the second channel control module 112b. The second routing module 110b performs a path computation for obtaining a second channel request and outputting the second channel request to the second channel control module 112b.

In the meaning time, when the second channel control module 112b receives the second channel request, the second channel control module 112b decodes the second channel request into a second output request and outputs the second output request to the first router 102a through the signal transmission line 122b. Besides, the second channel control module 112b also generates a second output arbitration signal and a second output selection signal according to the second channel request, and outputs the second output arbitration signal to the second arbitration module 114b and outputs the second output selection signal to the second input/output port 118b respectively.

The first channel control module 112a receives the second output request through the signal transmission line 122b and generates a second input selection signal according to the second output request for outputting the second input selection signal to the first input/output port 118a.

The second interleaver 116b is connected to the second register 108b and the second input/output port 118b. The second interleaver 116b outputs the second data temporarily stored in the second register 108b to the first router 102a through the second input/output port 118b and the first channel 104.

In a preferred embodiment of the present invention, the first input/output port 118a is connected to the first register 108a for temporarily storing the second data transmitted from the second router 102b. As the same reason, the second input/output port 118b is connected to the second register 108b for temporarily storing the first data transmitted from the first router 102a.

Figure 1B:
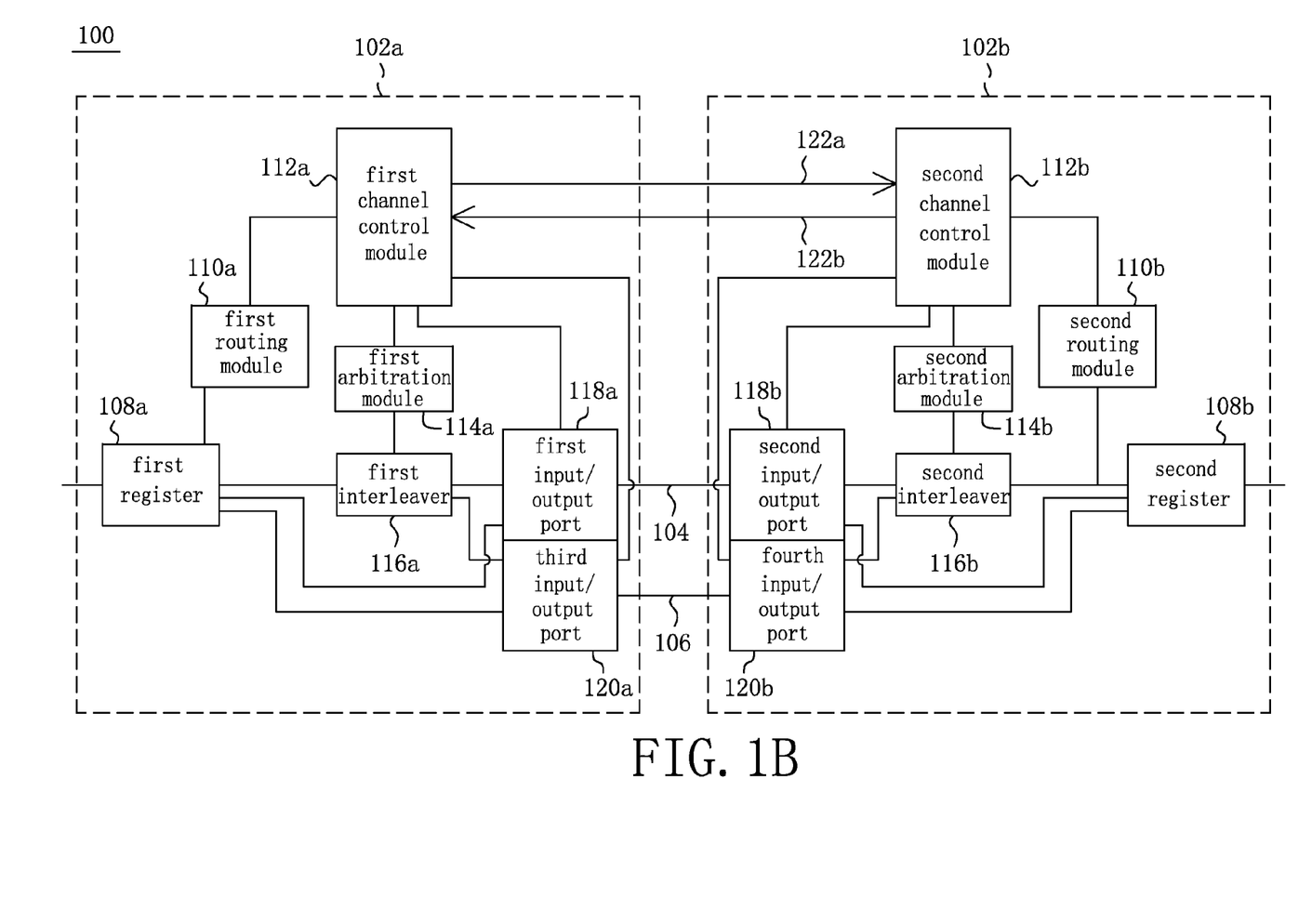
FIG. 1B is a schematic diagram of circuit block of adjacent routers in a network-on-chip architecture of another embodiment of the present invention.

Please refer to FIG. 1B, it is a schematic diagram of circuit block of adjacent routers in a network-on-chip architecture of another embodiment of the present invention. The difference between FIG. 1B and FIG. 1A is that FIG. 1A has only one channel and FIG. 1B has two channels. In the present embodiment, a channel amount of adjacent two routers is not limited here. Besides, the same parts of FIG. 1B and FIG. 1A are not described below.

In FIG. 1B, the first channel 104 and the second channel 106 are used to transmit data between the first router 102a and the second router 102b. Moreover, the first channel 104 is respectively connected to the first input/output port 118a and the second input/output port 118b, and the second channel 106 is respectively connected to a third input/output port 120a and a fourth input/output port 120b. The first channel control module 112a is respectively connected to the first input/output port 118a and the third input/output port 120a, and the second channel control module 112b is respectively connected to the second input/output port 118b and the fourth input/output port 120b. The first interleaver 116a is respectively connected to the first input/output port 118a and the third input/output port 120a, and the second interleaver 116b is respectively connected to the second input/output port 118b and the fourth input/output port 120b. The first register 108a is respectively connected to the first input/output port 118a and the third input/output port 120a, and the second register 108b is respectively connected to the second input/output port 118b and the fourth input/output port 120b.

In the FIG. 1B, the first router 102a and the second router 102b respectively has other directional channel (not shown) for transmitting with peripheral routers (not shown). In the present embodiment, when the first router 102a receives a plurality of data, the first routing module 110a generates a plurality of channel requests according to the plurality of data or heads of the plurality of data and transmits the plurality of channel requests to the first channel control module 112a.

When the first channel control module 112a receives the plurality of channel requests, the first channel control module 112a decodes the plurality of channel requests into a plurality of output requests for outputting the output requests to the second router 102b through the signal transmission line 122a. Secondly, the first channel control module 112a generates a plurality of output arbitration signals and a plurality of output selection signals according to the plurality of channel requests for outputting the plurality of output arbitration signals to the first arbitration module 114a and outputting the plurality of output selection signals to the first input/output port 118a. Wherein, the first channel control module 112a further determines whether a number of the plurality of channel requests is larger or equal to 2 (In FIG. 1B, assuming that a present transmission direction of the first channel 104 is from the first router 102a to the second router 102b, and a present transmission direction of the second channel 106 is from second router 102b to the first router 102a). When the number is larger or equal to 2, the directions of the first channel 104 and the second channel 106 are changed from the first router 102a to the second router 102b by the selection signal. When the number is smaller than 2 (or smaller or equal to 1), the present operation modes of the first input/output port 118a and the third input/output port 120a are kept by the selection signal.

As the same reason, the second channel control module 112b also determines whether to change the present operation modes of the second input/output port 118b and the fourth input/output port 120b according to the plurality of output requests.

In a preferred embodiment of the present invention, when a number of the channels between the first router 102a and the second router 102b is three and two transmission directions of the three channels are from the first router 102a to the second router 102b, if the number of the channel requests received by the first channel control module 112a is 2, the first channel control module 112a do not changes the operation modes of the three channels. Otherwise, when a number of the channels between the first router 102a and the second router 102b is three and one transmission direction of the three channels is from the first router 102a to the second router 102b, if the number of the channel requests received by the first channel control module 112a is 2, the first channel control module 112a changes the operation mode of one of the two same transmission direction channel, i.e. the first channel control module 112a compares the number of the channel requests and the number of the transmission directions. If the number of the channel requests is larger than the number of the transmission directions, the operation mode is changed. If the number of the channel requests is smaller than the number of the transmission directions, the operation mode is not changed.

In a preferred embodiment of the present invention, the first register 108a stores the data received by the first input/output port 118a and the third input/output port 120a. The second register 108b stores the data received by the second input/output port 118b and the fourth input/output port 120b.

In a preferred embodiment of the present invention, a number of the signal transmission lines 122a, 122b can be increased with the number of the channels. For example, in the FIG. 1B, the number of the signal transmission lines 122a, 122b can be 2. The present invention, however, is not limited thereto.

Figure 2:
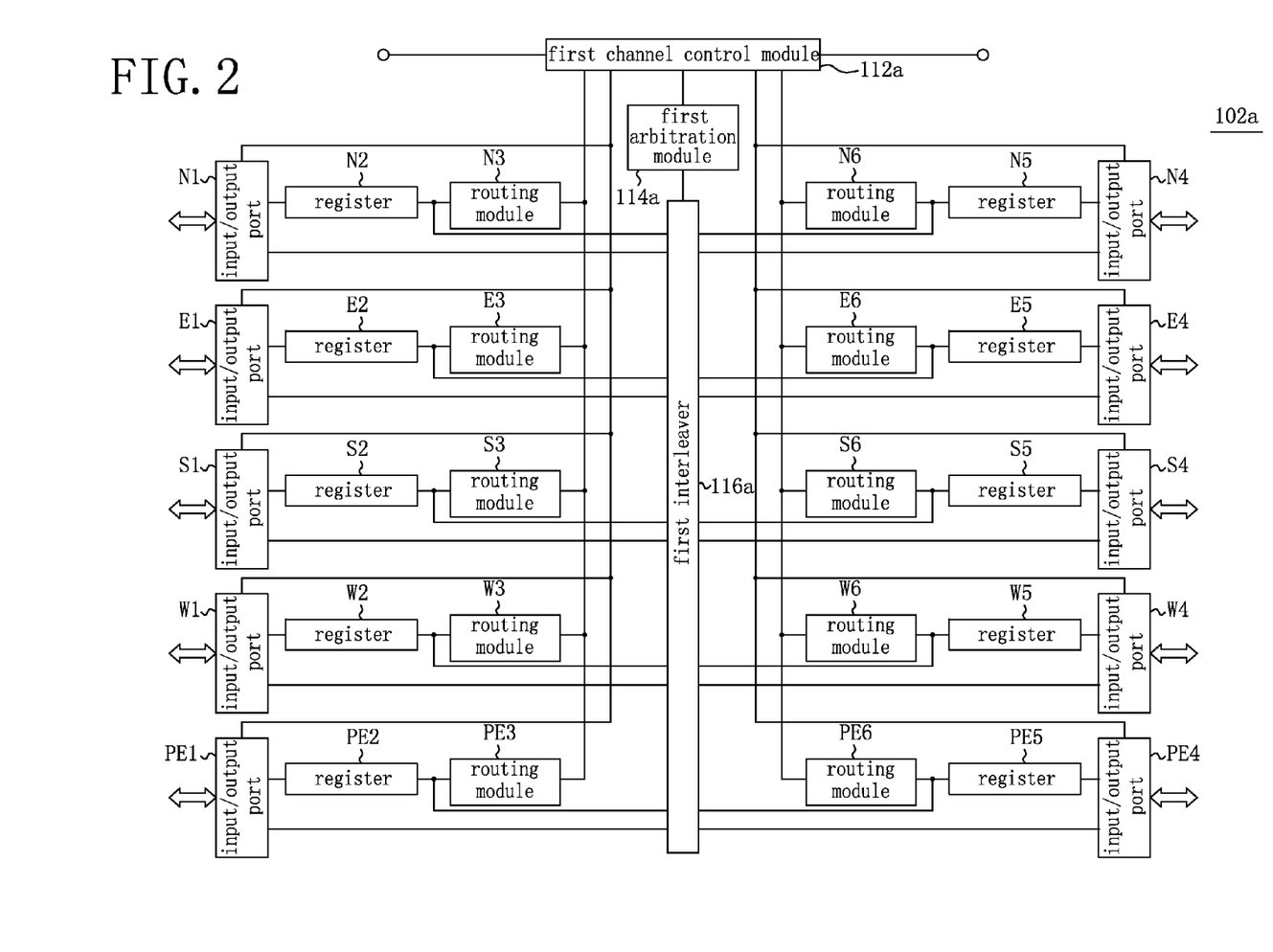
FIG. 2 is a schematic diagram of circuit block of single router of an embodiment of the present invention.

Please refer to FIG. 2, it is a schematic diagram of circuit block of single router of an embodiment of the present invention. In the present embodiment, the first router 102a is exampled as below. The first router 102a comprises a first channel control module 112a, a first arbitration module 114a, a first interleaver 116a, four channels and channels connected to processing element. Wherein, the four channels comprises four directions composed of east, south, west, and west channels for connecting to four adjacent routers. For example, every channel all comprises the first channel 104 and the second channel 106 of the FIG. 1B. One of ordinary skill in the art should know that the number of channels is defined by design need. The present invention, however, four channels are not limited thereto.

In a preferred embodiment of the present invention, a network type composed by the routers cane be ring network, star network, mesh network or tree network, however, is not limited thereto.

In FIG. 2, the first channel of the north direction channel comprises an input/output port N1, a register N2, and a routing module N3, and the second channel of the north direction channel comprises an input/output port N4, a register N5, and a routing module N6. The first channel of the east direction channel comprises an input/output port E1, a register E2, and a routing module E3, and the second channel of the east direction channel comprises an input/output port E4, a register E5, and a routing module E6. The first channel of the south direction channel comprises an input/output port S1, a register S2, and a routing module S3, and the second channel of the south direction channel comprises an input/output port S4, a register S5, and a routing module S6. The first channel of the west direction channel comprises an input/output port W1, a register W2, and a routing module W3, and the second channel of the west direction channel comprises an input/output port W4, a register W5, and a routing module W6. The first channel of channel connected to the processing element comprises an input/output port PE1, a register PE2, and a routing module PE3, and the second channel of channel connected to the processing element comprises an input/output port PE4, a register PE5, and a routing module PE6. Wherein, the input/output port PE1 and the input/output port PE4 are respectively connected to the processing element (not shown) through a network interface (not shown).

The routing modules N3, E3, S3, W3, PE3, N6, E6, S6, W6, and PE6 are connected to the first channel control module 112a for outputting the first output arbitration signal and the first output selection signal or the first input selection signal when receiving the first channel request and the second output request. The control method is the same as FIG. 1A and without more description here.

Figure 3A:
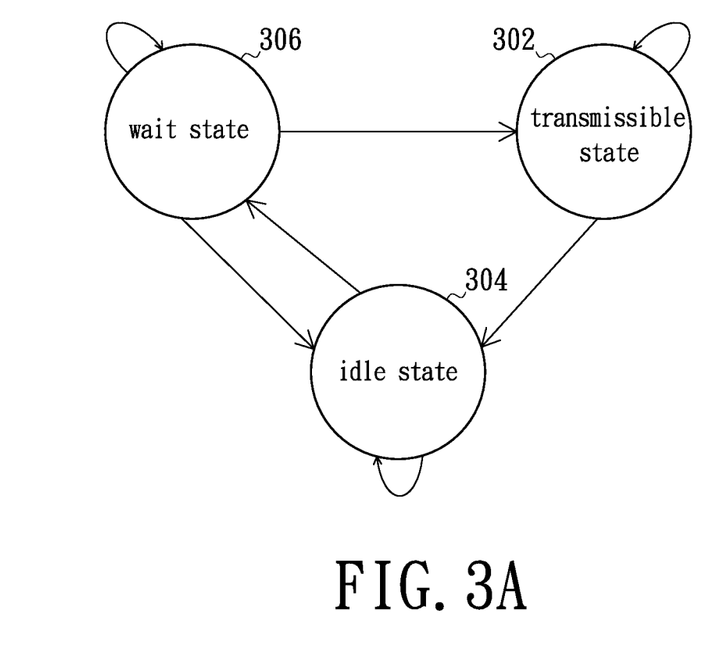
FIG. 3A is a schematic diagram of finite state machine of an embodiment of the present invention.

Please refer to FIG. 3A, it is a schematic diagram of finite state machine of an embodiment of the present invention. For example, a finite state machine is disposed in the first channel control module 112a and the second channel control module 112b of FIG. 1B for determining a present mode of the first channel 104 or the second channel 106 to output the output selection signals for changing the first operation mode, the second operation mode, the third operation mode, and the fourth operation mode. Wherein, a number of the finite state machine can be as the same as the number of the channels. Therefore, in FIG. 1B, the first channel control module 112a has one finite state machine for controlling the first input/output port 118a and another finite state machine for controlling the third input/output port 120a. As the same reason, the second channel control module 112b has one finite state machine for controlling the second input/output port 118b and another finite state machine for controlling the fourth input/output port 120b.

Please refer to FIG. 1B and FIG. 3A, the finite state machine comprises a transmissible state 302, an idle state 304, and a wait state 306. Wherein, the transmissible state 302 is priority than the idle state 304 and the wait state 306, i.e. the transmissible state 302 has an authority for preferential using the channel. In the initial state, the first input/output port 118a can be set at the transmissible state 302, and the second input/output port 118b can be set at the idle state 304. Thus, the first router 102a can output the data to the second router 102b through the first channel 104. The third input/output port 120a can be set at the idle state 304, and the fourth input/output port 120b can be set at the transmissible state 302. Thus, the second router 102b can output the data to the first router 102a through the second channel 106.

For example, in the FIG. 1B, when one of the first router 102a or the second router 102b does not receives the first channel request or the second channel request, the present modes of the first to fourth operation modes are kept. When the first router 102a receives two channel requests, the finite state machine of the first channel control module 112a outputs the selection signals for keeping the first operation mode as the transmissible state 302 and changing the second operation mode from the idle state 304 to the wait state 306 to change the wait state 306 into the transmissible state 302 when reaching a threshold time. Wherein, the threshold time is used to determine whether the second channel control module 112*b* receives other second channel request during the threshold time to avoid collision with the fourth operation mode (the present state is the transmissible state 302).

In the second router 102*b*, when the second router 102*b* receives the second input request, the second operation mode is kept at the idle state 304 by the selection signal. Besides, the fourth operation mode is changed from the transmissible state 302 to the idle state 304.

In a preferred embodiment of the present invention, during threshold time that the third operation mode is kept at the wait state 306, if the second channel control module 112*b* receives other second channel request (i.e. the first router 102*a* receives the output request transmitted from the second router 102*b*), the third operation mode is changed from the wait state 306 to the idle state 304 by the selection signal outputted by the first channel control module 112*a*.

Figure 3B:
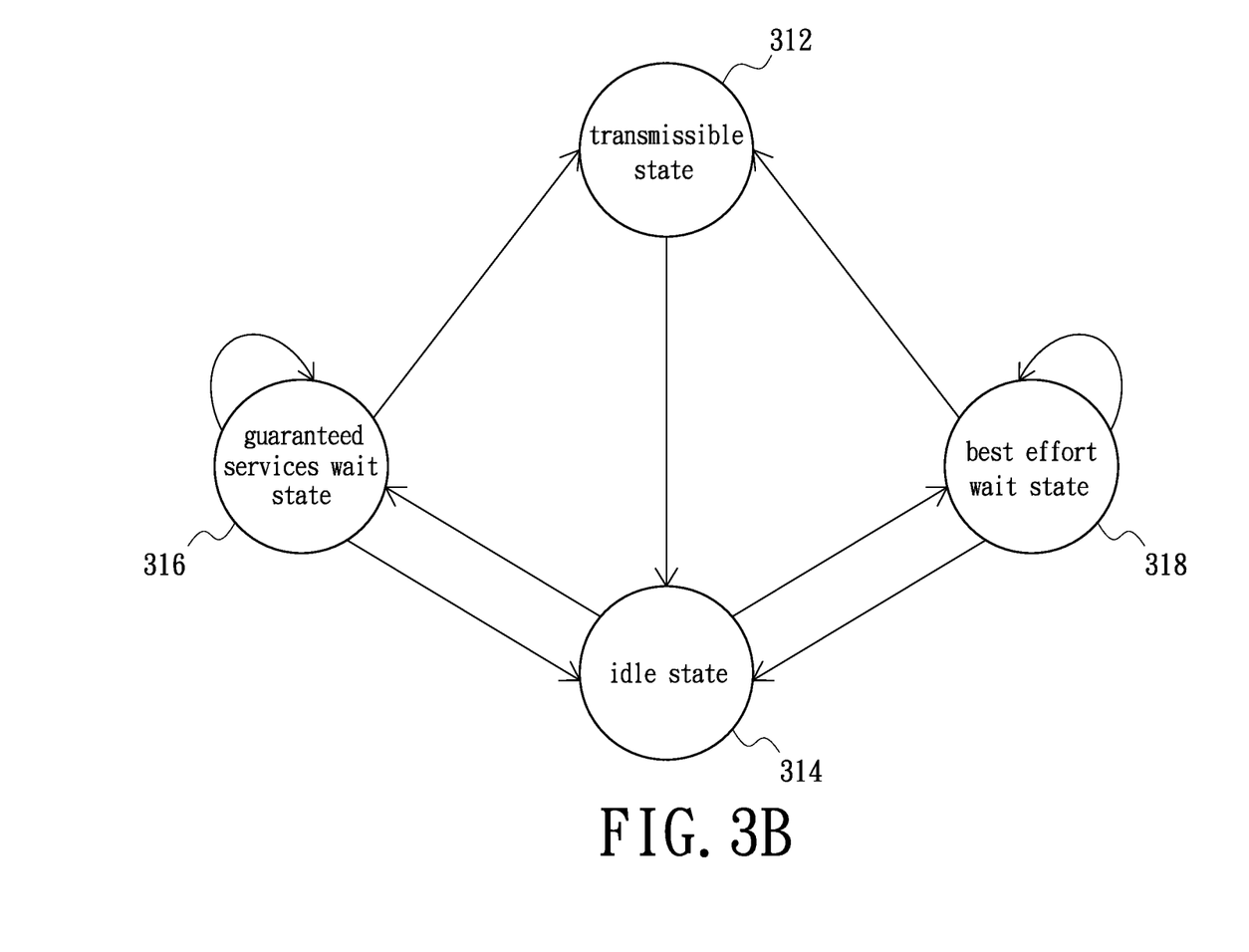
FIG. 3B is a schematic diagram of finite state machine of an embodiment of the present invention.

Please refer to FIG. 3B, it is a schematic diagram of finite state machine of an embodiment of the present invention. In the present invention, for example, the finite state machine is disposed in the first channel control module 112*a* and the second channel control module 112*b* of the FIG. 1B for determining the present state of the first channel 104 or the second channel 106 to output the output selection signals for changing the first operation mode, the second operation mode, the third operation mode, and the fourth operation mode. Wherein, a number of the finite state machine can be as the same as the number of the channels. Therefore, in FIG. 1B, the first channel control module 112*a* has one finite state machine for controlling the first input/output port 118*a* and another finite state machine for controlling the third input/output port 120*a*. As the same reason, the second channel control module 112*b* has one finite state machine for controlling the second input/output port 118*b* and another finite state machine for controlling the fourth input/output port 120*b*.

Please refer to FIG. 1B and FIG. 3B, the finite state machine comprises a transmissible state 312, an idle state 314, and a guaranteed services wait state 316, and a best effort wait state 318. Wherein, the guaranteed services wait state 316 means that the first channel 104 and the second channel 106 can be used preferentially when the first data or the second data is guaranteed data.

The difference between FIG. 3B and FIG. 3A is that the first router 102*a* or the second router 102*b* determines whether the received data is guaranteed data at first and decides to change the idle state 314 into the best effort wait state 318 or the guaranteed services wait state 316. When the received data is guaranteed data, the idle state 314 is changed into the guaranteed services wait state 316 and the guaranteed services wait state 316 is changed into the transmissible state 312 when reaching the threshold time. Otherwise, when the received data is normal data, the idle state 314 is changed into the best effort wait state 318 and the best effort wait state 318 is changed into the transmissible state 312 when reaching the threshold time.

The guaranteed services wait state 316 is changed into the idle state 314 if the received output request from the corresponding router is a guaranteed output request during the threshold time of the guaranteed services wait state 316. The threshold time of the guaranteed services wait state 316 is continuously counted if the received output request from the corresponding router is a normal output request during the threshold time of the guaranteed services wait state 316.

As the same reason, the best effort wait state 318 is changed into the idle state 314 if the received output request from the corresponding router is a guaranteed output request during the threshold time of the best effort wait state 318. The threshold time of the best effort wait state 318 is interrupted if the received output request from the corresponding router is a normal output request during the threshold time of the best effort wait state 318.

In a preferred embodiment of the present invention, the router determines whether the data or the output request is a priority transmission data for abdicating the channel to the priority transmission data when receiving the data or the output request transmitted from adjacent router.

Figure 4:
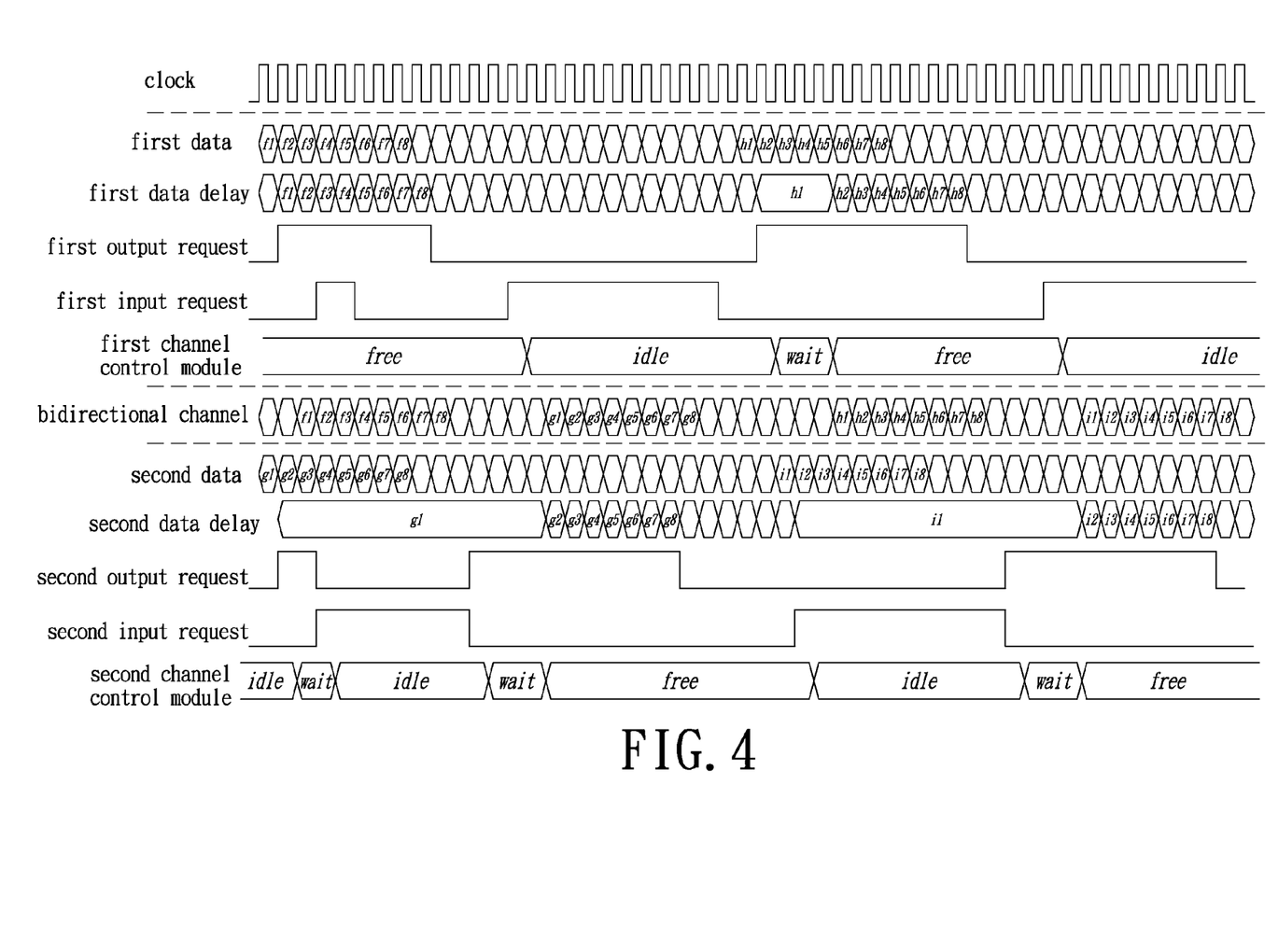
FIG. 4 is a schematic diagram of clock allocation of transmitting data each other of adjacent routers of an embodiment of the present invention.

Please refer to the FIG. 4, it is a schematic diagram of clock allocation of transmitting data each other of adjacent routers of an embodiment of the present invention. Please refer to FIG. 1A, FIG. 3, and FIG. 4, in the embodiment, the direction of the first channel 104 is from the first router 102*a* to the second router 102*b*. The first router 102*a* receives the packages f, h in order, and the second router 102*b* receives the packages g, i in order. Wherein, the length of the packages f, g, h, i are all 8.

In FIG. 4, the waves of the first data and the second data means that a time of the package f, g respectively reaches the register of the first router 102*a* and the second router 102*b*. The first data delay means that an operation time of the first routing module 110*a*, the first channel control module 112*a*, and the first arbitration module 114*a*. The second data means that an operation time of the second routing module 110*b*, the second channel control module 112*b*, and the second arbitration module 114*b*.

The first router 102*a* and the second router 102*b* receive respectively the package f (first data) and the package g (second data) at the same tome. The first router 102*a* and the second router 102*b* output respectively the first output request and the second output request at the same time. The first router 102*a* can transmit the package f to the second router 102*b* due to the direction of the first channel 104 is from first router 102*a* to the second router 102*b*. Therefore, the first channel control module 112*a* keeps the first operation mode at the transmissible state. The second channel control module 112*b* changes the second operation mode from the idle state to the wait state. But, the second operation mode is changed from the wait state to the idle state due to the second channel control module 112*b* receives the first output request form the first router 102*a*.

During the clock 3 to 10, the first router 102*a* transmits the package f to the second router 102*b*. Therefore, at the clock 11, the first output request is lowered by the first router 102*a*, and the second router 102*b* transmits the second output request to the first router 102*a*. At clock 13, the first router 102*a* changes the first operation mode into the idle state. At clock 11, the second router 102*b* changes the second operation mode from the idle state to the wait state and changes the second operation mode from the wait state to the transmissible state when reaching the threshold time (three clocks). At clock 16, the second router 102*b* transmits the package g.

At clock 26, the first router 102*a* receives the package g so that the first router 102*a* changes the first operation mode from the idle state to the wait state. The wait state is changed into the transmissible state when reaching the threshold time (three clocks). At the same time, the second operation mode is changed from the transmissible state to the idle state. At clock 28, the second router 102*b* receives the package I and outputs the second output request. As the transmission step described above-mentioned, the first router 102*a* transmits the package h to the second router 102*b* firstly due to the first router 102*a* has the priority. Secondly, the second router 102*b* transmits the package i to the first router 102*a*.

Figure 5A:
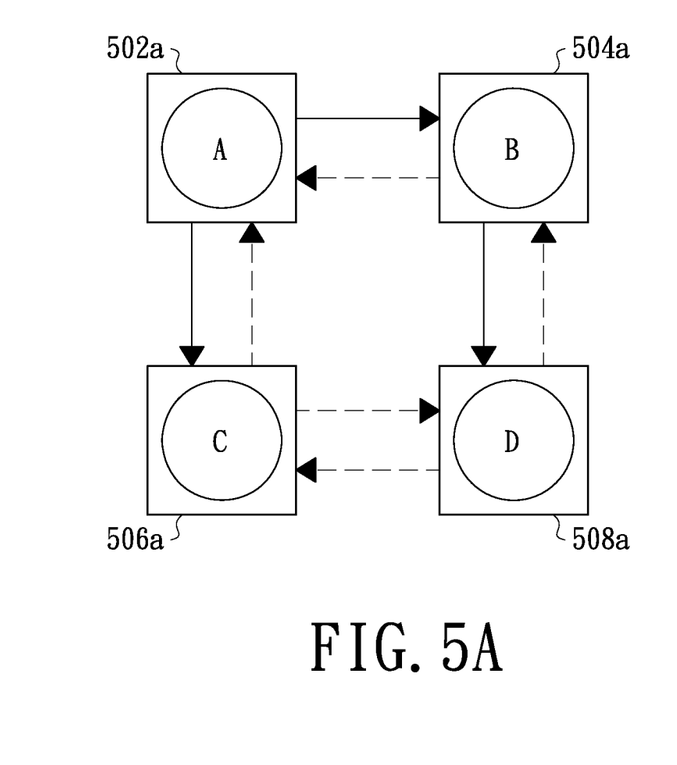
FIGS. 5A~5D are schematic diagrams of time cycles of comparing dynamical adjusting channel direction and fixed transmission direction of an embodiment of the present invention.
Figure 5B:
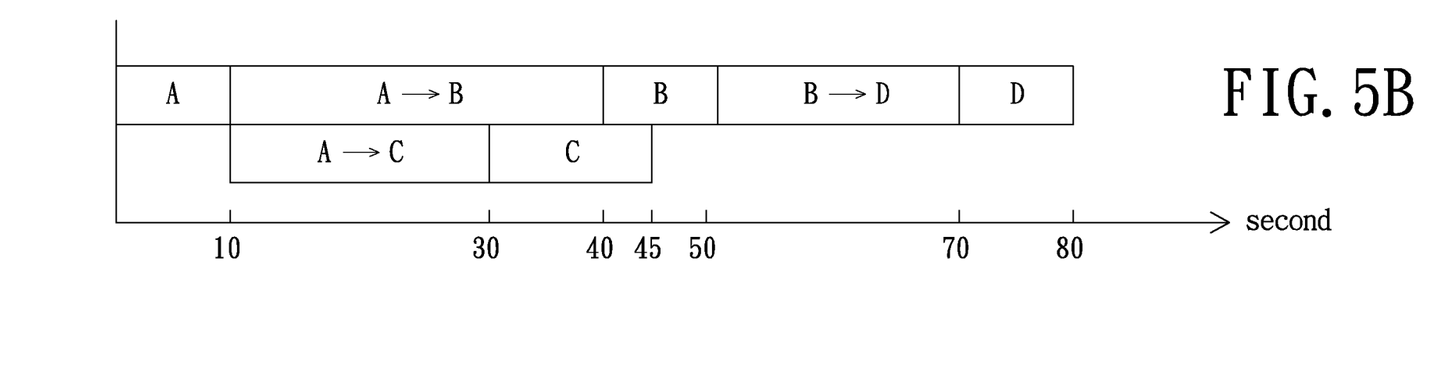
Figure 5C:
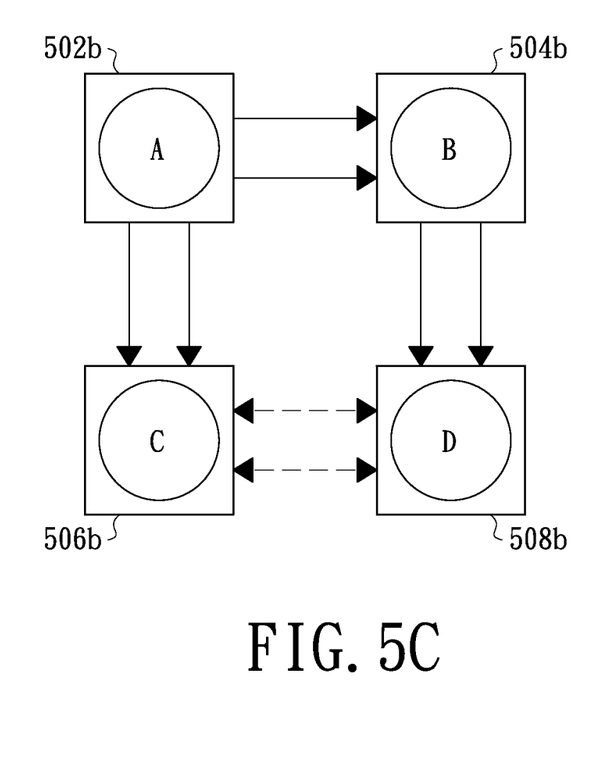
Figure 5D:
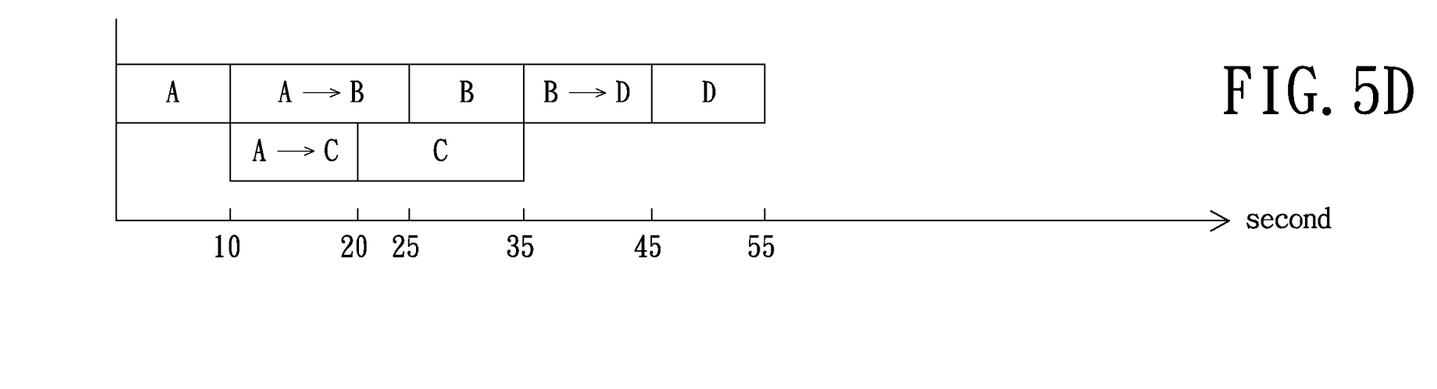

Please refer to FIGS. 5A~5D, they are schematic diagrams of time cycles of comparing dynamical adjusting channel direction and fixed transmission direction of an embodiment of the present invention. FIG. 5A is a schematic diagrams of conventional 2×2 network-on-chip architecture, FIG. 5B is a schematic diagrams of transmission cycles of conventional 2×2 network-on-chip architecture, FIG. 5c is a schematic diagrams of 2×2 network-on-chip architecture of the present invention, and FIG. 5D is a schematic diagrams of transmission cycles of 2×2 network-on-chip architecture of the present invention.

In the routers A to D, doe example, the data is transmitted from the router A to router D and a processing time of the processor of every router is 10 seconds. In FIGS. 5A and 5B, when the router A receives two data, the data is outputted to the router B after processed (10 seconds). The time of the transmission is 30 seconds. When the router B receives the data, the processing time of the processor is 10 seconds and the transmission time transmitting to the router D is 20 seconds. Therefore, the transmission time of the architecture of FIG. 5A is 80 seconds.

In FIGS. 5C and 5D, when the router A receives two data, the data is outputted to the router B after processed (10 seconds). The time of the transmission is 15 seconds due to bidirectional transmission. When the router B receives the data, the processing time of the processor is 10 seconds and the transmission time transmitting to the router D is 10 seconds. Therefore, the transmission time of the architecture of FIG. 5C is 55 seconds.

As the same reason, two data transmitted from the router A to C of the architecture of FIG. 5A is 45 seconds, and two data transmitted from the router A to C of the architecture of FIG. 5C is only 35 seconds.

Figure 6:
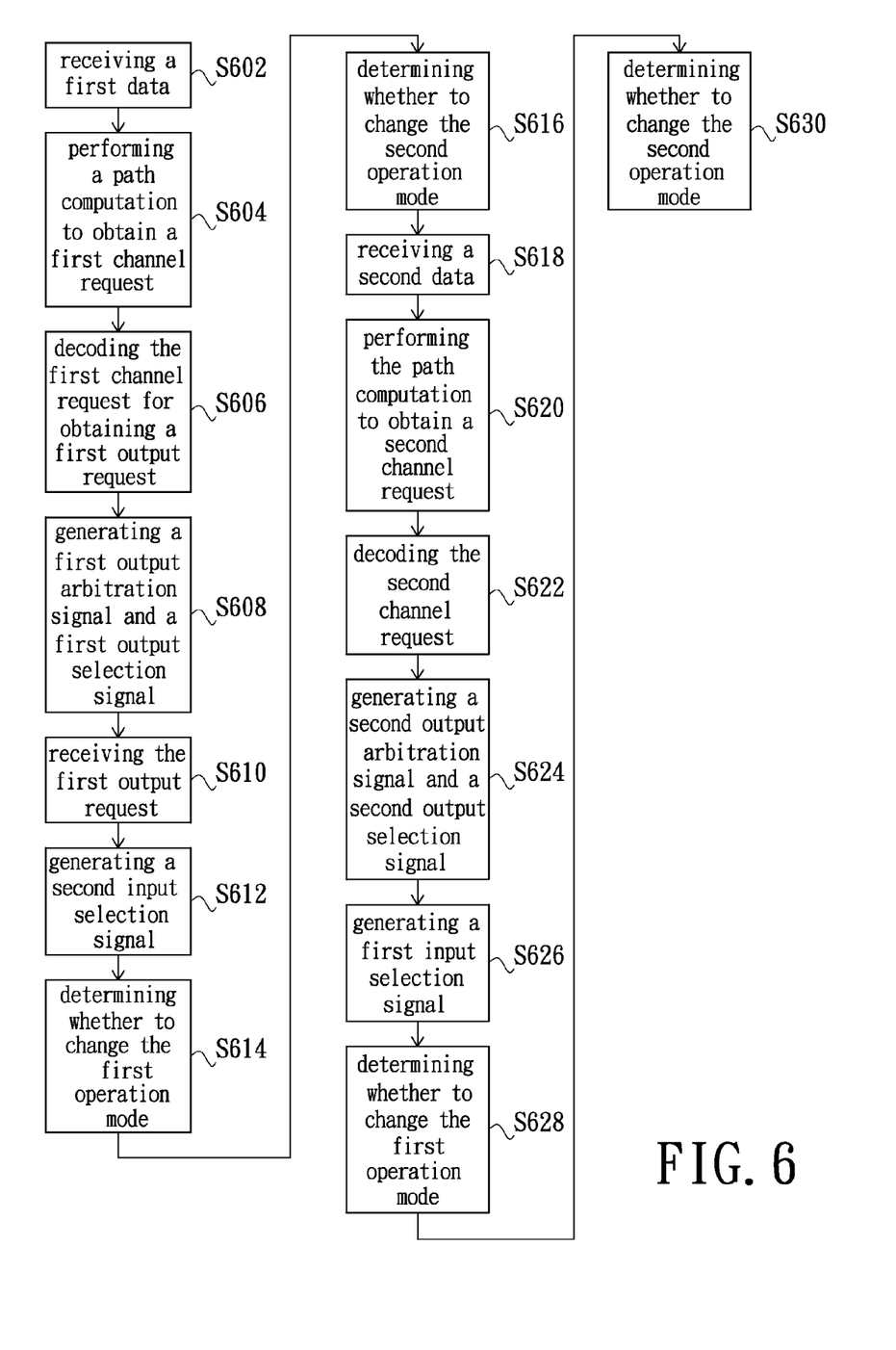
FIG. 6 is a schematic diagram of flowchart of method for dynamical adjusting channel direction of an embodiment of the present invention.

Please refer to FIG. 6, it is a schematic diagram of flowchart of method for dynamical adjusting channel direction of an embodiment of the present invention. Please refer to FIG. 1A and FIG. 6, when the first register 108a receives the first data transmitted from other router, the first data is temporarily stored in the first register 108a and outputted to the first routing module 110a and the first interleaver 116a (step S602). Secondly, the first routing module 110a performs a path computation according to a head of the data for obtaining the first channel request to output the first channel request to the first channel control module 112a (step S604).

The first channel control module 112a decodes with the first channel request for generating the first output request. The first channel control module 112a transmits the first output request to the second router 102b through the signal transmission line 122a (step S606). Besides, the first channel control module 112a also generates the first output arbitration signal and the first output selection signal according to the first channel request for outputting the first output arbitration signal to the first arbitration module 114a and outputting the first output selection signal to the first input/output port 118a (step S608).

The second channel control module 112b receives the first output request (step S610). Secondly, the second channel control module 112b generates a first input selection signal according to the first output request for outputting the first input selection signal to the second input/output port 118b (step S612).

Continuously, the first input/output port 118a decides whether to change the first operation mode according to the first output selection signal (step S614). Besides, the second input/output port 118b decides whether to change the second operation mode according to the first input selection signal (step S616). Wherein, change or not of the first and second operation mode are the same as described above of FIG. 3a, 3B, 4 and without more description here.

After the data is transmitted, when the second register 108b receives the second data (receiving the second data transmitted from other router), the second data is temporarily stored in the second register 108b and outputted to the second routing module 110b and the second interleaver 116b (step S618). Secondly, the second routing module 110b performs the path computation according to the head of the second data for obtaining the second channel request to output the second channel request to the second channel control module 112b (step S620).

The second channel control module 112b decodes with the second channel request for generating the second output request (step S622). The second channel control module 112b outputs the second output request to the first router 102a through the signal transmission line 122b. Besides, the second channel control module 112b also generates the second output arbitration signal and the second output selection signal according to the second channel request for outputting the second output arbitration signal to the second arbitration module 114b and outputting the second output selection signal to the second input/output port 118b (step S624).

The first channel control module 112a receives the second output request. Secondly, the first channel control module 112a generates the first a second input selection signal according to the second output request for outputting the second input selection signal to the first input/output port 118a (step S626).

Continuously, the second input/output port 118b decides whether to change the second operation mode according to the second output selection signal (step S628). Besides, the first input/output port 118a decides whether to change the first operation mode according to the second input selection signal (step S630). Wherein, change or not of the first and second operation mode are the same as described above of FIG. 3a, 3B, 4 and without more description here.

In a preferred embodiment of the present invention, the length of the threshold time is decided by the delay time of the register of the first router 102a and the second router 102b.

In conclusion, the method for dynamical adjusting channel direction and network-on-chip architecture thereof of the present invention can change the transmission direction of the channels elastically and use frequency width effectively. Besides, the method can reduce the delay time during the package transmission and has higher package transmission efficiency.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A network-on-chip architecture for dynamical adjusting channel direction comprising:
   a first channel having a first transmission direction;
   a first router coupled to the first channel for generating a first output request and outputting the first output request when receiving a first data, the first router comprising:
   a first input/output port coupled to the first channel and the first input/output port having a first operation mode; and a first channel control module coupled to the first input/output port, for outputting the first output request and generating a first output selection signal; and a second router coupled to the first router and the first channel for receiving the first data through the first channel when receiving the first output request, the second router comprising:

a second input/output port coupled to the first channel and the second input/output port having a second operation mode; and a second channel control module coupled to the second input/output port and the first channel control module for receiving the first output request, and the second channel control module generating and outputting a first input selection signal according to the first output request;

wherein, the first input/output port receives the first output selection signal and decides whether to change the first operation mode, the second input/output port receives the first input selection signal and decides whether to change the second operation mode, and the first transmission direction is formed by the first operation mode and the second operation mode;

wherein the first router further comprises:

a first register for receiving and storing the first data;

a first routing module coupled to the first register for performing a bath computation with the first data to obtain and output a first channel request;

the first channel control module further coupled to the first routing module for receiving the first channel request and outputting the first output request after being decoded, the first channel control module generating and outputting a first output arbitration signal; and a first arbitration module coupled to the first channel control module for receiving and deciding a timing of the first data when outputted according to the first output arbitration signal.

2. The network-on-chip architecture for dynamical adjusting channel direction of claim 1, wherein the second router further comprises:

a second arbitration module coupled to the second channel control module.

3. The network-on-chip architecture for dynamical adjusting channel direction of claim 2, wherein the first operation mode and the second operation mode respectively comprises a transmissible state, an idle state, and a wait state.

4. The network-on-chip architecture for dynamical adjusting channel direction of claim 3, wherein the first operation mode is set with the transmissible state and the second operation mode is set with the idle state in an initial state, and the first router outputs the first data to the second router through the first channel.

5. The network-on-chip architecture for dynamical adjusting channel direction of claim 4, wherein the second router further comprises:

a second register for receiving and storing a second data;

a second routing module coupled to the second register and the second channel control module for performing the path computation with the second data to obtain and output a second channel request.

6. The network-on-chip architecture for dynamical adjusting channel direction of claim 5, wherein the second channel request is decoded into a second output request for output when the second channel control module receives the second channel request, and the second channel control module generates and outputs a second output arbitration signal and a second output selection signal according to the second channel request.

7. The network-on-chip architecture for dynamical adjusting channel direction of claim 6, wherein the second arbitration module receives the second output arbitration signal and decides a timing of the second data when being outputted according to the second output arbitration signal.

8. The network-on-chip architecture for dynamical adjusting channel direction of claim 7, wherein the first channel control module receives the second output request, and the first channel control module generates and outputs a second input selection signal according to the second output request.

9. The network-on-chip architecture for dynamical adjusting channel direction of claim 8, wherein when the second channel control module and first channel control module respectively receives the second output request, the first operation mode is changed into the idle state by the first input selection signal and the second operation mode is changed into the wait state by the second output selection signal, and the wait state is changed into the transmissible state when reaching a threshold time.

10. The network-on-chip architecture for dynamical adjusting channel direction of claim 2, wherein the first operation mode and the second operation mode respectively comprises a transmissible state, an idle state, a guaranteed services wait state, and a best effort wait state.

11. The network-on-chip architecture for dynamical adjusting channel direction of claim 10, wherein when the first operation mode is set with the idle state and the second operation mode is set with the transmissible state, the first operation mode should be changed into the guaranteed services wait state or the best effort wait state before being changed into the transmissible state, and the guaranteed services wait state or the best effort wait state is changed into the transmissible state when reaching a threshold time.

12. The network-on-chip architecture for dynamical adjusting channel direction of claim 11, wherein the first operation mode is changed into the guaranteed services wait state at first when the first data is determined as a guaranteed data by the first channel control module.

13. The network-on-chip architecture for dynamical adjusting channel direction of claim 11, wherein the first operation mode is changed into the best effort wait state at first when the first data is determined as a normal priority data by the first channel control module.

14. A method for dynamical adjusting channel direction suitable for a network-on-chip architecture, the network-on-chip architecture comprising a first channel having a first transmission direction, the first channel be connected to a first input/output port of a first router having a first operation mode and a second input/output port of a second router having a second operation mode, the method for dynamical adjusting channel direction comprising:

receiving and temporarily storing a first data;

performing a path computation to obtain a first channel request;

decoding the first channel request for obtaining a first output request to generate a first output arbitration signal and a first output selection signal according to the first channel request;

generating a first input selection signal according to the first output request; and determining whether to change the first operation mode and the second operation mode according to the first output selection signal and the first input selection signal respectively;

wherein the first transmission direction is formed by the first operation mode and the second operation mode; the first operation mode and the second operation mode respectively comprises a transmissible state, an idle state, and a wait state; the first operation mode is set with the transmissible state and the second operation mode is set with the idle state in an initial state, and the first router outputs the first data to the second router through the first channel.

15. The method for dynamical adjusting channel direction of claim 14, further comprising:
receiving and storing a second data;
performing the path computation with the second data to obtain a second channel request;
decoding the second channel request into a second output request to generate a second output arbitration signal and a second output selection signal according to the second channel request; and
generating a second input selection signal according to the second output request.

16. The method for dynamical adjusting channel direction of claim 15, wherein when the second output request is generated, the first operation mode is changed into the idle state by the second input selection signal and the second operation mode is changed into the wait state by the second output selection signal, and the wait state is changed into the transmissible state when reaching a threshold time.

17. The method for dynamical adjusting channel direction of claim 14, wherein the first operation mode and the second operation mode further comprise a guaranteed services wait state and a best effort wait state.

18. The method for dynamical adjusting channel direction of claim 17, wherein when the first operation mode is the idle state and the second operation mode is set with the transmissible state, the first operation mode should be changed into the guaranteed services wait state or the best effort wait state before changed into the transmissible state, and the guaranteed services wait state or the best effort wait state is changed into the transmissible state when reaching a threshold time.

19. The method for dynamical adjusting channel direction of claim 18, wherein the first operation mode is changed into the guaranteed services wait state at first when the first data is determined as a guaranteed data by the first channel control module.

20. The method for dynamical adjusting channel direction of claim 19, wherein the first operation mode is changed into the best effort wait state at first when the first data is determined as a normal priority data by the first channel control module.

* * * * *